(12) United States Patent
Noirot-Nerin et al.

(10) Patent No.: US 12,055,915 B2
(45) Date of Patent: Aug. 6, 2024

(54) SYSTEM FOR CONTROLLING MACHINING OF A PART

(71) Applicants: Airbus SAS, Blagnac (FR); Airbus Operations SAS, Toulouse (FR)

(72) Inventors: Emeric Noirot-Nerin, Blagnac (FR); Ivan Hamm, Blagnac (FR); Gérard Poulachon, Blagnac (FR); Frédéric Rossi, Blagnac (FR)

(73) Assignees: Airbus SAS, Blagnac (FR); Airbus Operations SAS, Toulouse (FR)

( * ) Notice: Subject to any disclaimer, the term of this patent is extended or adjusted under 35 U.S.C. 154(b) by 323 days.

(21) Appl. No.: 17/485,887

(22) Filed: Sep. 27, 2021

(65) Prior Publication Data

US 2022/0100168 A1 Mar. 31, 2022

(30) Foreign Application Priority Data

Sep. 29, 2020 (FR) ...................................... 2009937

(51) Int. Cl.
*G05B 19/4065* (2006.01)
*G06N 20/00* (2019.01)

(52) U.S. Cl.
CPC ......... *G05B 19/4065* (2013.01); *G06N 20/00* (2019.01); *G05B 2219/37258* (2013.01);
(Continued)

(58) Field of Classification Search
CPC ................ G05B 19/4065; G05B 19/18; G05B 2219/37258; G05B 2219/37355; G06N 20/00
See application file for complete search history.

(56) References Cited

U.S. PATENT DOCUMENTS 6,344,724 B1 * 2/2002 Kakino .............. G05B 19/4065
318/569
2008/0161959 A1 7/2008 Jerard et al.
(Continued)

FOREIGN PATENT DOCUMENTS

EP       1522384 A1    4/2005
WO   2015079164 A1    6/2015
WO   2019145515 A2    8/2019

OTHER PUBLICATIONS

French Search Report; priority document.

*Primary Examiner* — Mohammad Ali
*Assistant Examiner* — Vincent W Chang
(74) *Attorney, Agent, or Firm* — Greer, Burns & Crain, Ltd.

(57) ABSTRACT

This control system takes into account the thermomechanical aspects of materials to quickly and easily determine optimal cutting conditions and to automatically control machining to preserve the integrity of the workpiece. This system includes an acquisition module configured to acquire values of a set of input parameters relating to cutting conditions and material properties of the piece, and a microprocessor configured for determining at least one operating cutting parameter representative of a cutting signal from the machining apparatus using a set of output parameters of an integrity model previously constructed during a learning phase. The integrity model connects the set of input parameters to the set of output parameters comprising specific cutting coefficients representative of the material integrity of the piece, and establishes at least one fatigue threshold of the at least one cutting operating parameter. The fatigue threshold allows control of the progress of cutting operations.

9 Claims, 2 Drawing Sheets

(52) U.S. Cl.
CPC .............. *G05B 2219/37355* (2013.01); *G05B 2219/45044* (2013.01); *G05B 2219/50206* (2013.01); *G05B 2219/50319* (2013.01)

(56) References Cited

U.S. PATENT DOCUMENTS

| | | | |
|---|---|---|---|
| 2016/0147212 A1* | 5/2016 | Kurosumi | G05B 19/4166 700/160 |
| 2016/0290906 A1 | 10/2016 | Rancic et al. | |
| 2017/0315535 A1* | 11/2017 | Ishii | G05B 19/402 |
| 2019/0196451 A1* | 6/2019 | Kakimoto | G05B 19/40938 |
| 2020/0103868 A1* | 4/2020 | Kojima | G05B 19/4187 |
| 2021/0034798 A1 | 2/2021 | Bruneel et al. | |

* cited by examiner

SYSTEM FOR CONTROLLING MACHINING OF A PART

CROSS-REFERENCES TO RELATED APPLICATIONS

This application claims the benefit of the French patent application No. 2009937 filed on Sep. 29, 2020, the entire disclosures of which are incorporated herein by way of reference.

FIELD OF THE INVENTION

The present invention relates to the field of the machining of a part and, in particular, the control of the machining of an avionic part.

BACKGROUND OF THE INVENTION

Manufacturers, and, in particular, aircraft manufacturers, as supplier of a product meeting very strict safety criteria, are also guarantors of quality and service life of the manufactured parts. Standards intrinsic to the manufacturing methods are thus developed by the aircraft manufacturers and must be applied throughout their supply chain.

Very particular attention regarding the impact of the manufacturing methods and, more particularly, the machining with respect to material integrity of the part has been paid by the aeronautical authorities. The service integrity of the materials machined has become a major line of study in order to improve the lifetime of the machined parts and thus is of particular interest to the manufacturer who is mandated to ensure the quality of the parts that it provides. It is, in fact, known that the mechanical fatigue strength of the metal parts depends thereon.

In 1998, the FAA (Federal Aviation Administration) launched the RoM (Rotor Manufacturing) project, made up of the same partners as the RISC (Rotor Integrity Sub-Committee) project. The objective of this group of engine manufacturers is to issue recommendations on the best manufacturing practices to be applied in order for them to become mandatory. These requirements lead each engine manufacturer to define the sensitivity of the parts as a function of the machining operations in terms of tolerance to damage and to put in place internal manufacturing specifications to be followed in order to guarantee their conformity.

In 2001, the ManHIRP (Integrity process controls with Manufacturing to produce High Integrity Rotating Parts for modern gas turbines) project brought together all of the European engine manufacturers. The objective of this program was to metallurgically characterize the machining defects, study their detectability during and after the machining and assess their fatigue effect in order to measure their severity. The collimation of this study was to obtain the anomalies most prejudicial to the fatigue strength of the materials whose defects have been most often simulated.

In 2008, and following the ManHIRP project, a new project evolved from the results of this study: the ACCENT project, whose first objective was to demonstrate the utility of using monitoring means in the machining in order to secure the operation with respect to material integrity. These monitoring means could be used as non-destructive testing (NDT) means making it possible to detect, quantify or even anticipate damage to the material in the machining By making use of the results of the ManHIRP project expressing the severity of the anomalies with respect to the lifetime of a part in operation, the use of monitoring means as NDT means should guarantee the properties of the critical parts and their durability. Thus, it would be possible to most appropriately design the forms and the dimensions of the parts. The second objective of the use of the monitoring means is to be able to adapt the machining method to the variations of the manufacturing process (cutting conditions, tool wear, etc.) by validating areas of use and no longer concentrating on a set procedure. The expected benefits would be significant and relate to the reduction of the machining time, the optimization of the lifetime of the tools and the elimination of the revalidation costs linked to the minor changes to the manufacturing process.

In 2008, Airbus launched the HOMDA (HOlistic Machining Digital Approach) project, defining monitoring and automation means making it possible to increase the productivity of the machining while guaranteeing the material integrity of the part.

In fact, in order to predict the surface integrity of the materials machined, it is important to estimate the cutting forces. Also, this information can be collected through quantities called "cutting-specific coefficients". The values of the cutting-specific coefficients vary as a function of the kinematic machining parameters (cutting speed, tool advance and engagement, etc.), of the nature of the material machined (alloy of titanium, of aluminum, ferrous alloy, etc.), of the nature of the machining material (carbide grade, ARS, ceramic, etc.) and of the geometry of the cutting edge (rake angle, relief angle, connection radius, helix angle, etc.).

The determination of these coefficients is traditionally performed by "tool-material pairing" tests (standard NF E 66-520) and by cutting edge-material pairing tests (orthogonal or oblique cutting tests). However, they require costly instrumentation (strain gauge, wattmeter on the spindle or on the variable speed drive) and the use of dedicated machines called numerically-controlled machine-tools MCMT (or planing bench). Furthermore, these tests have to be performed for each new pairing of machining/machined materials.

It will be noted that numerically-controlled machine tools (NCMT) are relatively poor in terms of information on the cutting process. In machining phase, the NCMT are very efficient in tracking the tool trajectories which have been programmed, but they lack information as to the progress of the cutting. Consequently, without instrumentation, they cannot raise their "intelligence" level and themselves detect failings such as damage to the tool or the spindle, excessive wear, vibrations, a collision, absence of the part or of the tool, etc. It is therefore necessary to instrument the NCMT in order to acquire information and force signals on the progress of the machining.

The force signals contain a lot of information, notably as to the state of the tool and its level of wear. But it is also possible, for an identified thermomechanical loading which would be applied to the machined surface, to deduce therefrom the cause-and-effect relationship between the surface integrity and the operational parameters. The force signals then become an index of the quality of the machined surface. The machining power, dependent on the cutting forces, contains information on the integrity of the pairing of machined and machining materials.

In milling, the power consumed by the spindle is often used (e.g., Artis or DigitalWay systems). The consumed power does not fully have the sufficient sensitivity to detect damage to the tool. The measurements of forces (thrust force and tool torque), of vibrations or of acoustic emissions are therefore prioritized. Some propose an entire range of sensors that can be used according to the needs of the applications, and by combining multiple measurements.

The dynamometric tables are very widely used for measuring cutting forces and are the favored tool for performing experimental research work. In fact, their great accuracies, sensitivities and bandwidths make it possible to establish relationships between the cutting forces and the operational parameters, and validate machining monitoring strategies. Nevertheless, they are expensive and they can be damaged in case of impact. Their dimensions considerably limit the workspace (machining parts of small size) and specific work-holders must be used. For all these reasons, the dynamometric tables cannot be used industrially, in production.

Moreover, there are methods for qualifying operational parameters that make it possible to secure the material health of the critical parts machined and guarantee their lifetime in terms of fatigue. The qualification of the window of operational parameters can be performed by directly correlating the kinematic parameters with the number of cycles to failure of the material machined. The concern is therefore to machine, in operational conditions subject to qualification, a statistical sample of several fatigue test pieces (Standard EN 6072) by varying the operational kinematic conditions, then to test the life of the samples (bending test). The operational conditions for which these samples favorably meet the lifetime criteria in terms of fatigue are thereby qualified.

Although the approach of direct correlation between the operational conditions and the lifetime in terms of fatigue are particularly effective for rapidly qualifying kinematic conditions of a tool with fixed geometry, it becomes particularly limited in the context of the current development of the cutting tools market (new geometries, coating, carbide grade, even new materials such as ceramics or diamond tools), new machining assistance technologies (high pressure lubrications, cryogenics, vibratory assistance, laser, etc.), new high-speed machines (new HSM speed ranges, tool attachment technology, integrated sensors, etc.).

An object of the present invention is, consequently, to propose a system (and a method) that takes account of the thermomechanical aspects of the materials to simply and rapidly determine the optimal cutting conditions and to automatically control the machining in order to preserve the integrity of the machined part.

SUMMARY OF THE INVENTION

The present invention relates to a control system used in the machining of a part by a machining machine, comprising:
an acquisition module configured to acquire values of a set of input parameters relating to cutting conditions and properties of the material of the part, and
a microprocessor configured to:
determine at least one operational cutting parameter representative of a cutting signal from the machining machine by using a set of output parameters of an integrity model constructed previously in a learning phase, the integrity model linking the set of input parameters to the set of output parameters comprising specific cutting coefficients representative of the material integrity of the part, and
establish at least one fatigue threshold of the at least one operational cutting parameter, the fatigue threshold allowing the progress of the cutting operations to be controlled.

This system establishes a window of cutting conditions guaranteeing the material integrity of the machined part. In fact, the system takes account of the output parameters representative of the material integrity of the machined part to select the appropriate cutting conditions and to control the machining in order to preserve the integrity of the part.

Advantageously, the acquisition module is configured to acquire, during the machining of the part, at least one cutting signal, and the microprocessor is configured to control the progress of the cutting operations by ensuring that the value of the cutting signal is bounded by the fatigue threshold.

This allows for real-time monitoring of the machining of the part and also makes it possible to optimize the lifetime of the tools and eliminate the costs of revalidation linked to changes in the manufacturing process.

Advantageously, the at least one operational cutting parameter is a torque parameter C representative of a torque signal from the machining machine or a power parameter representative of a power signal from the machining machine, and the at least one fatigue threshold is a torque threshold or a power threshold.

The torque and power signals are very easy to measure, thus making it possible to simply, rapidly and inexpensively guarantee the integrity of the machined part bearing in mind that the machining machines usually already comprise power and torque measurement sensors.

According to one embodiment of the present invention, the acquisition module is configured to acquire, in a learning phase, values of input parameters comprising:
macroscopic kinematic parameters comprising a cutting speed parameter $v_c$, a tooth advance parameter $f_z$, a parameter of axial engagement of the tool $a_p$, and a parameter of radial engagement of the tool $a_e$;
parameters of the geometry of the tool comprising a rake angle $\gamma_n$, and a helix angle $\lambda_s$;
tribology parameters comprising a mean angle of friction $\beta_\alpha$; and
parameters of the material comprising a specific heat capacity $c_{cp}$, a density $\rho$ and a Taylor-Quinney coefficient $\chi$; and
the microprocessor is configured to construct the integrity model by using physical analytical and/or empirical relationships linking the set of input parameters to the set of output parameters representative of the cutting forces.

The integrity model makes it possible to correlate the surface integrity properties with operational cutting parameters and cutting tools. That makes it possible to frame the cutting condition parameters and simulate the loading of such parameters on the surface of the machined part. Thus, from the operational parameters and the cutting tool parameters, the model is capable of predicting how these parameters will thermo-mechanically load the material. In particular, the mechanical loading parameters provide information on the interactions between the tool and the part, and therefore on the progress of the machining, on the vibratory behavior, on the state of the tool, that of the spindle, and on the material health or surface integrity of the machined part.

Advantageously, the microprocessor is configured to:
calculate, by using geometrical and empirical relationships, the values of angles characteristic of the oblique cutting comprising an oblique shear angle $\phi_i$, a normal shear angle $\phi_n$, a normal projection angle $\theta_n$, an oblique projection angle $\theta_i$ and a chip flow angle $\eta$, as a function of the values of a mean angle of friction $\beta_\alpha$, of a rake angle $\gamma_n$, and of a helix angle (true rake angle) $\lambda_s$, and calculate, by using analytical and empirical relationships, the values of the parameters of the orthogonal cutting comprising the thickness values of the shear band $h_s$, and an asymmetry factor $k_s$ by using the values of the cutting speed $v_c$, the normal shear angle $\phi_n$ and the rake angle $\gamma_n$.

Advantageously, the microprocessor is further configured to:

determine the shear deformation $\gamma_s$ and deformation ratio $d\gamma_s/dt$ values in the primary shear band as a function of the thickness values of the shear band $h_s$ and of the asymmetry factor $k_s$, and use a law of behavior of the material and the shear deformation $\gamma_s$ and deformation ratio $d\gamma_s/dt$ values as well as the parameter values of the material to determine a shear stress $\tau_s$ in the primary shear band.

Advantageously, the microprocessor is also configured to calculate the specific cutting coefficients comprising a cutting-edge tangential force coefficient $K_{tc}$, a cutting edge radial force coefficient $K_{rc}$ and a cutting edge axial force coefficient $K_{ac}$, as a function of the shear stress $\tau_s$, and the oblique shear angle $\phi_i$, the normal shear angle $\phi_n$, the normal projection angle $\theta_n$, the oblique projection angle $\theta_i$ and the helix angle $\lambda_s$.

The specific cutting coefficients represent the cutting forces and temperatures that allow the surface integrity of the materials machined to be predicted.

Advantageously, the microprocessor is also configured to:

calculate instantaneous machining forces comprising a cutting-edge tangential force $F_t$, a cutting edge radial force $F_r$, and a cutting edge axial force $F_a$, as a function of the specific cutting coefficients (cutting edge tangential force coefficient $K_{te}$, a cutting edge radial force coefficient $K_{re}$, a cutting edge axial force coefficient $K_{ae}$), an engaged tooth width $b_{\lambda s}$, and the chip thickness h, calculate the torque parameter C at the spindle and the power parameter P at the spindle as a function of the cutting-edge tangential force $F_t$, the cutting speed $v_c$ and the diameter of the tool D, and establish a torque threshold and a power threshold as a function of the torque C and power P parameters.

The present invention also targets a numerically-controlled machining machine comprising the control system according to any one of the preceding features.

The present invention relates also to a control method used in the machining of a part by a machining machine, comprising the following steps:

acquiring values of a set of input parameters relating to cutting conditions and material properties of the part, and determining at least one operational cutting parameter representative of a cutting signal from the machining machine by using a set of output parameters of an integrity model constructed previously in a learning phase, the integrity model linking the set of input parameters to the set of output parameters comprising specific cutting coefficients representative of the material integrity of the part, and establishing at least one fatigue threshold of the at least one operational cutting parameter, the fatigue threshold allowing the progress of the cutting operations to be controlled.

BRIEF DESCRIPTION OF THE DRAWINGS

Other particular features and advantages of the device and of the method according to the invention will be better revealed on reading the description given hereinbelow, in an indicative but nonlimiting manner, with reference to the attached drawings in which.

DETAILED DESCRIPTION OF THE PREFERRED EMBODIMENTS

A principle of the invention comprises controlling the progress of the operations involved in the cutting of a part according to parameters representative of the material integrity of the machined part determined as a function of the thermomechanical aspects of the part.

It will be noted that machining is a manufacturing method based on material removal. Consequently, energy-related forces via mechanical actions are necessary to plastically deform, separate and remove the material from the machined part. Thus, the present invention proposes analyzing these mechanical actions to determine the interactions between the tool and the machined part to then control and monitor the material integrity of any part during the machining thereof.

Figure 1:
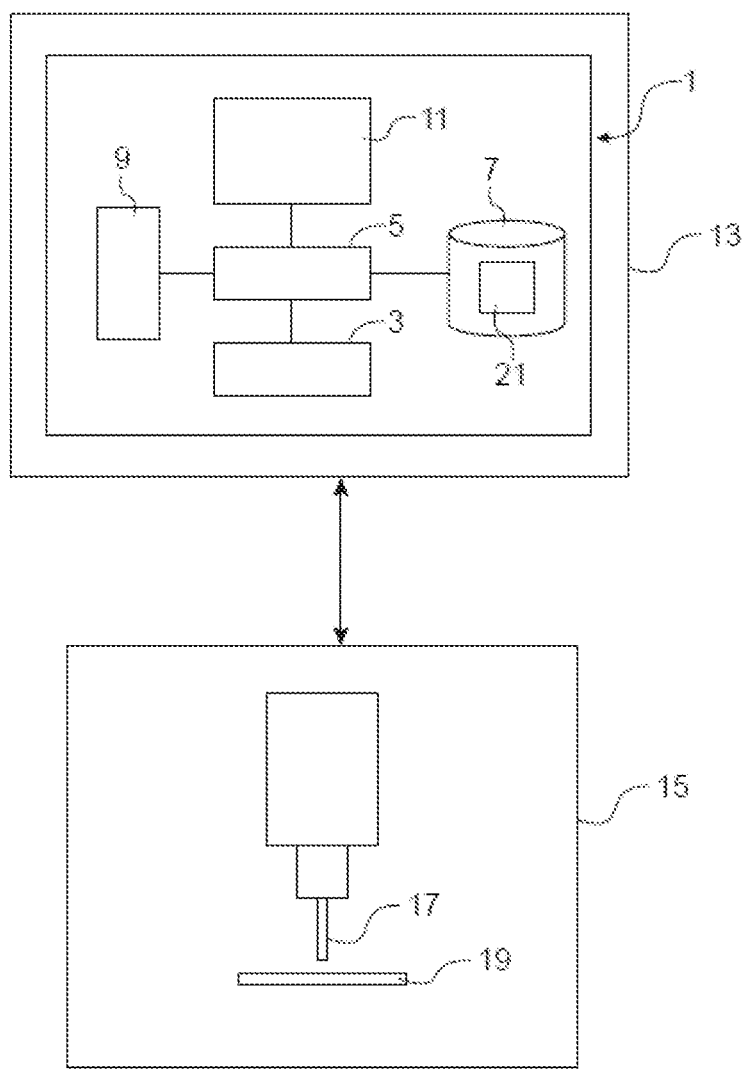
FIG. 1 schematically illustrates a system for controlling the machining of a part, according to an embodiment of the invention.

FIG. 1 schematically illustrates a system for controlling the machining of a part, according to an embodiment of the invention.

According to the invention, the control system 1 comprises an acquisition module 3, a microprocessor 5, a storage unit 7, an input interface 9 (for example, a keyboard) and an output interface 11 (for example, a screen). Advantageously, all these hardware elements of the control system 1 are already incorporated in a control device 13 of a numerically-controlled machining machine 15. The machining machine 15 is generally equipped with a magazine containing different cutting tools 17 (boring and drilling tools, milling tools, etc.) that make it possible to machine programmed shapes on the part 19 of interest.

The acquisition module 3 is configured to acquire data corresponding to a set of input parameters relating to cutting conditions and properties of the material of the part 19 to be machined. These input parameters are kinematic, geometrical, tribological or physical variables relating to the part to be machined and to the machining tool.

The microprocessor 5 is configured to determine at least one operational cutting parameter representative of a cutting signal from the machining machine 15 by using a set of output parameters of an integrity model 21 constructed previously in a learning phase and stored in the storage unit 7. This integrity model 21 is constructed so as to link the set of input parameters to the set of output parameters which comprise specific cutting coefficients representative of the material integrity of the machined part (see FIG. 2).

Furthermore, the microprocessor 5 is configured to establish a fatigue threshold relative to each operational cutting parameter. Each fatigue threshold corresponds to a window of cutting conditions that allow the progress of the cutting operations to be controlled, bearing in mind that the corresponding operational cutting parameter has an influence on the mechanical behavior of the machined part 19. Thus, the control of the operations via the window of cutting conditions guarantees the material integrity of the part 19.

In fact, the acquisition module 3 is configured to acquire at least one cutting signal in a procedure in the machining of the part.

As an example, the operational cutting parameter can advantageously be a torque parameter C representative of a torque signal from the spindle of the machining machine 15 or a power parameter representative of a power signal also from the machining machine 15. In these cases, the corresponding fatigue threshold is a torque threshold or a power threshold. The machining machines 15 usually already comprise power and torque measurement sensors. These values depend on the material machined.

As an example, in order to maintain the safety and integrity criteria for titanium TA6V, the power threshold is approximately 1600 W and the torque threshold is approximately 60 Nm.

Furthermore, the microprocessor 5 is configured to control and monitor, in real time, the progress of the cutting operations by comparing the value of the fatigue threshold corresponding to the cutting signal and by checking that the value of the cutting signal is still bounded by the fatigue threshold. Thus, the material integrity of the machined part 19 is ensured as long as the cutting signal does not exceed the corresponding fatigue threshold. For example, for titanium TA6V, the power is controlled by the microprocessor to remain contained between 80 W and 1600 W and, likewise, the torque is controlled to remain contained between 8 Nm and 60 Nm.

It will be noted that the operational cutting parameter can also be the electrical current consumed by the machining machine 15, bearing in mind that the latter also comprises a current measurement sensor. Moreover, the operational cutting parameter can be the vibration of the spindle of the machining machine 15, or any other parameter.

Figure 2:
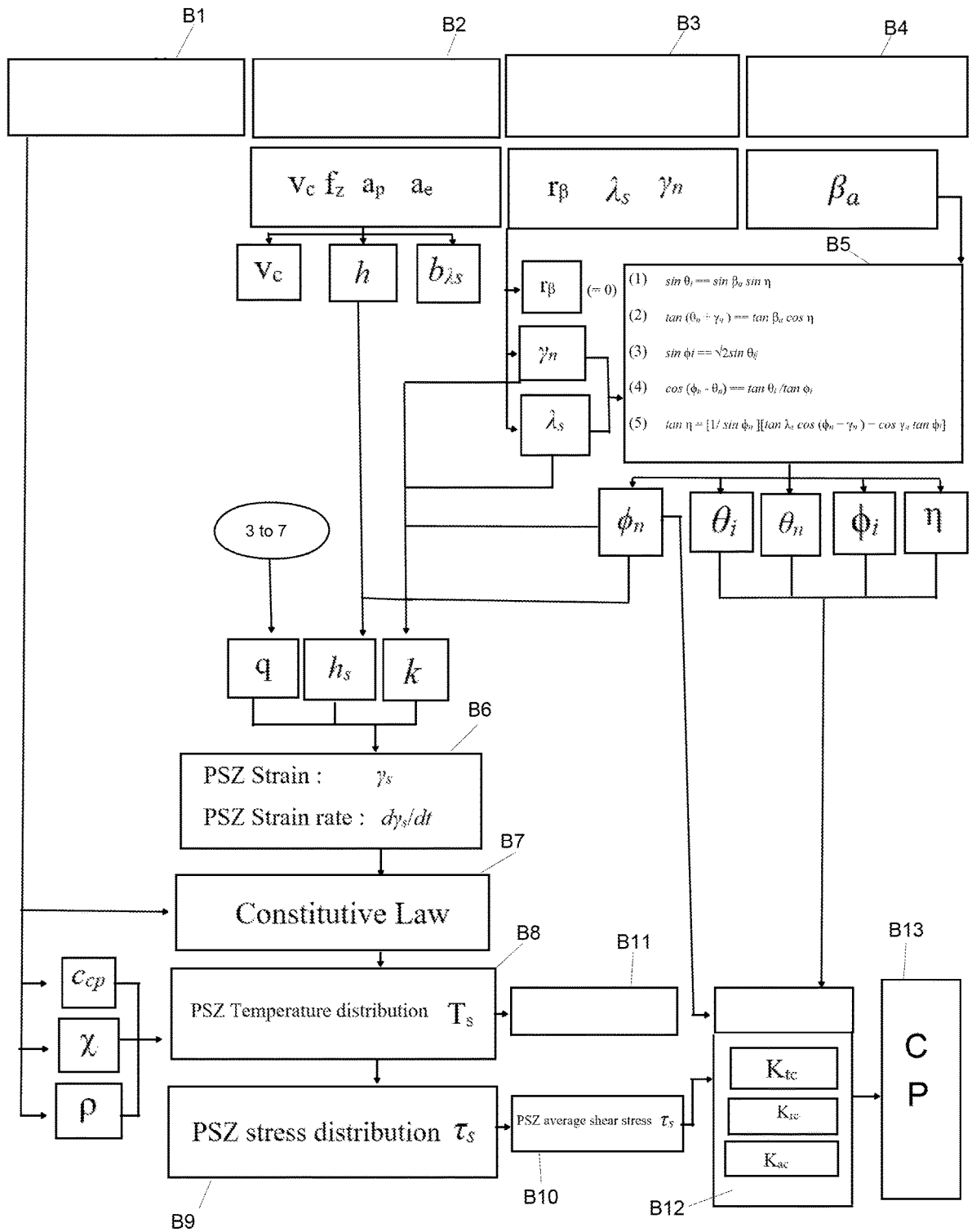
FIG. 2 is a block diagram illustrating the construction of an integrity model, according to an embodiment of the invention.

FIG. 2 is a block diagram illustrating the construction of an integrity model, according to an embodiment of the invention.

The construction of the integrity model is done in a learning phase. As an example, the integrity model is constructed according to the following properties or constraints:

the cutting tool is assumed rigid with a cutting edge acuity radius $r_\beta$ equal to zero;

the chip formed is continuous;

the cut thickness is small compared to the cutting width b, which justifies plane strain machining;

the kinematic field depends only on the shear coordinates $x_{cp}$, which can be justified by the low sensitivity to temperature in industrially viable conditions;

the material is assumed homogeneous, isotropic and follows a viscoplastic behavior law;

the thickness of the shear band is assumed constant. The shear plane (AB) divides the shear band $h_s$ into two zones. A relatively wide input zone whose thickness is defined by the relationship $k \times h_s$ (in which $0<k<1$), and a relatively thin output zone whose thickness is defined by the relationship $(1-k) \times h_s$.

In the blocks B1-B4, the acquisition module is configured to acquire values of input parameters comprising the values of macroscopic kinematic parameters, of tool geometry parameters, of cutting-edge geometry parameters, of tribology parameters (i.e., friction) and of material parameters. The input parameter value can be saved in the storage unit.

In the block B1, the material parameters comprise a specific heat capacity $c_{cp}$, a density $\rho$ and a Taylor-Quinney coefficient $\chi$.

In the block B2, the macroscopic kinematic parameters comprise a cutting speed parameter $v_c$, a tooth advance parameter $f_z$, a parameter of axial engagement of the tool $a_p$, and a parameter of radial engagement of the tool $a_e$.

In the block B3, the tool geometry parameters comprise a rake angle $\gamma_n$, and a helix angle (i.e., true rake angle) $\lambda_s$.

Finally, in the block B4, the tribology parameters comprise a mean angle of friction $\beta_\alpha$.

In the blocks B5-B12, the microprocessor 5 is configured to construct the integrity model 21 by using physical analytical and/or empirical relationships linking the set of input parameters to the set of output parameters. The latter comprises specific cutting coefficients representative of the cutting constraints.

More particularly, in the block B5, the microprocessor 5 is configured to calculate, by using geometrical and/or empirical relationships, the values of angles characteristic of the oblique cutting comprising an oblique shear angle $\phi_i$, a normal shear angle $\phi_n$, a normal projection angle $\theta_n$, an oblique projection angle $\theta_i$, and a chip flow angle $\eta$. These angle values characteristic of the oblique cutting are calculated as a function of the values corresponding to the mean angle of friction $\beta_\alpha$, the rake angle $\gamma_n$, and the helix angle $\lambda_s$. It will be noted that the angle values characteristic of the oblique cutting allow the forces and temperatures during the oblique cutting to be predicted.

The geometrical relationships of the oblique cutting are defined by the following system of equations:

[Math. 1]

$$\sin \theta_i = \sin \beta_\alpha \sin \eta \qquad (1)$$

[Math. 2]

$$\tan(\theta_n + \gamma_n) = \tan \beta_\alpha \cos \eta \qquad (2)$$

[Math. 3]

$$\tan \eta = \left[\frac{1}{\sin \phi_n}\right] [\tan \lambda_s \cos(\phi_n - \gamma_n) - \cos \gamma_n \tan \phi_i] \qquad (3)$$

In order to resolve this system of three equations with five unknowns, two additional equations are necessary. The solving method based on the principle of maximization of the shear stress can be used. The system of equations can be solved by numerical iteration by an initial Stabler condition (described in "the fundamental geometry of cutting tools" Stabler, Proceedings of the institution of mechanical engineers 1951) according to which the chip flow angle $\eta$ is equal to the helix angle $\lambda_s$: (i.e., $\eta = \lambda_s$).

The rake $\gamma_n$ and helix $\lambda_s$ angles are known from the kinematic and geometrical aspects of the tooth. Moreover, the mean angle of friction $\beta = \beta_\alpha$ on the cutting face can be determined using planning tests or tribology tests.

It will be noted that the angle of friction can also be determined empirically. In fact, the angle of friction depends on the relative chip flow speed on the cutting face, on the pressure of the chip on the cutting face and on the tribological characteristics of the cutting face (polished surface, coating, etc.). An empirical relationship is known between the angle of friction and the cutting angle $\gamma_n$, given by the following equation:

[Math. 4]

$$\beta_\alpha = 19.1 + 0.29 \, \gamma_\eta \qquad (4)$$

This relationship is deduced empirically for the pairing of Ti-6Al-4V and carbide tool WC and for rake angles of between 0° and 12°.

Thus, at the output of the block B5, there are values of the oblique shear angle $\phi_i$, normal shear angle $\phi_n$, normal projection angle $\theta_n$, oblique projection angle $\theta_i$ and chip flow angle $\eta$. These values can be saved in the storage unit.

In the block B6, the microprocessor is configured to determine the shear deformation $\gamma_s$ and deformation ratio $d\gamma_s/dt$ values in the primary shear band.

The microprocessor first of all uses the values of the cutting speed $v_c$, the normal shear angle $\phi_n$, the rake angle $\gamma_n$ and the non-deformed chip thickness h to calculate, by means of the analytical and empirical relationships, the values of the orthogonal cutting parameters comprising the values of the thickness of the shear band $h_s$ and of an asymmetry factor $k_s$.

The thickness of the shear band $h_s$ can be calculated as a function of the non-deformed chip thickness h (of the order of 25 μm) and of the normal shear angle $\phi_n$, according to the following empirical relationship:

[Math. 5]
$$h_s = \frac{h}{10 \sin \phi_n} \quad (5)$$

Furthermore, the asymmetry factor $k_s$ can be calculated as a function of the normal shear angle $\phi_n$ and of the rake angle $\gamma_n$, according to the following empirical relationship:

[Math. 6]
$$k_s = \frac{\sin \phi_n \sin(\phi_n - \gamma_n)}{\cos \gamma_n} \quad (6)$$

Next, the microprocessor uses the shear band thickness $h_s$ and the asymmetry factor $k_s$ values calculated previously to determine a field of deformation and, in particular, the shear deformation $\gamma_s$ and deformation ratio $d\gamma_s/dt$ values in the primary shear band.

The deformation ratio $\dot{\gamma}_s = d\gamma_s/dt$ is defined by the following relationships:

[Math. 7]
$$\frac{d\gamma_s}{dt} = \dot{\gamma}_s = \begin{cases} \frac{\dot{\gamma}_m}{[(1-k)h_s]^q}[y_s + (1-k)h_s]^q & y_s \in [-(1-k)h_s; 0] \\ \frac{\dot{\gamma}_m}{[kh_s]^q}[kh_s - y_s]^q & y_s \in [0; kh_s] \end{cases} \quad (7)$$

The coefficient q depends on the cutting speed and can vary between the values 3 and 7. As an example, q is equal to 3 for low cutting speeds and can reach 7 for high speeds.

Furthermore, the shear deformation $\gamma_s$ is defined according to the following relationships:

[Math. 8]
$$\gamma_s = \begin{cases} \frac{\dot{\gamma}_m[y_s + (1-k)h_s]^{q+1}}{(q+1)v\sin\varphi[(1-k)h_s]^q} & y_s \in [-(1-k)h_s; 0] \\ \frac{\dot{\gamma}_m[kh_s - y_s]^{q+1}}{(q+1)[hk_s]^q} + v\sin\varphi\tan(\varphi - \gamma_n) & y_s \in [0; kh_s] \end{cases} \quad (8)$$

In the above relationships, the parameter $\dot{\gamma}_m$ represents the maximum deformation speed, the parameter v represents the cutting speed (i.e., $v=v_c$) acquired in the block B2, the parameter $\varphi$ is the normal shear angle $\phi_n$ deduced in the block B5 and the parameter $\gamma_n$ is the rake angle whose value is already known.

In the blocks B7-B10, the microprocessor is configured to determine a shear stress $\tau_s$ in the primary shear band. For that, the microprocessor uses a material behavior law (block B7) and the parameter values of the material comprising the specific heat capacity $c_{cp}$, the density ρ and the Taylor-Quinney coefficient χ, as well as the shear deformation $\gamma_s$ and deformation ratio $d\gamma_s/dt$ values.

It will be noted that it is possible to use any behavior law identified for the material of interest. As an example, it is possible to use a behavior law of Calamaz and Coupard type (described in "Strain field measurement in orthogonal machining of titanium alloy" Calamaz, Coupard, and Girot 2008). This law makes it possible to determine the shear stress $\tau_s$ in the primary shear zone as a function of the shear deformation $\gamma_s$, of the deformation ratio $d\gamma_s/dt$, of the rake angle $\gamma_n$, of the melting point of the material $T_m$, of the ambient temperature $T_r$ and of the temperature in the primary shear band $T_s$.

An example of behavior law defining the shear stress $\tau_s$ is given by the following formula:

[Math. 9]
$$\tau_s = \frac{1}{\sqrt{3}} \cdot \left[ A + B\left(\frac{\gamma_s}{\sqrt{3}}\right)^n \left(\frac{1}{\exp\left(\left(\frac{\gamma_s}{\sqrt{3}}\right)^a\right)}\right) \right]\left[1 + C\ln\left(\frac{\dot{\gamma}_s}{\dot{\gamma}_0}\right)\right]\left[1 - \left(\frac{T_s - T_r}{T_m - T_r}\right)^m\right] \quad (9)$$
$$\left[D + (1-D)\left[\tanh\left(\frac{1}{(\gamma + p)^r}\right)\right]^s\right];$$
$$D = 1 - \left(\frac{T}{T_m}\right)^d;$$
$$p = \left(\frac{T}{T_m}\right)^b$$

The parameters A, B, C, n, m, a, b, d, r, and s are known and have already been identified by different authors with ballistics tests for deformation speeds of between 0.0001s−1 and 2150s−1.

These values are defined in Table 1 below:

TABLE 1

| Parameter | A | B | n | C | m | A | b | d | r | s |
|---|---|---|---|---|---|---|---|---|---|---|
| Value | 862.5 | 331.2 | 0.34 | 0.012 | 0.8 | 0.5 | 5 | 1 | 2 | 0.05 |

In the blocks B8 and B9, the microprocessor uses the behavior law and a differential equation defining the temperature in the primary shear band $T_s$ as a function of the shear stress $\tau_s$ to determine the field of temperature $T_s$ and the shear stress $\tau_s$ by a numerical integration.

The differential equation is defined as a function of the shear stress $\tau_s$, of the deformation ratio $\dot{\gamma}$, of the ambient temperature $T_r$, of the Taylor-Quinney coefficient χ, of the specific heart capacity $c_{cp}$, of the density ρ, of the projection $V_n$ of the cutting speed $V_c$ on the axis $x_{\phi_n}$ of the reference frame ($x_{\phi_n}$, $y_{\phi_n}$) of the shear band, and of the temperature $y_s$ in the shear band, as follows:

[Math. 10]

$$T_s = \begin{cases} T_r + \dfrac{\chi}{\rho c_p V_n} \int_{y=(k-1)h_s}^{y=y_s} \tau_s \dot{\gamma} dy_s \\ T_s|_{y_s=0} + \dfrac{\chi}{\rho c_p V_n} \int_{y=0}^{y=y_s} \tau_s \dot{\gamma} dy_s \end{cases} \quad (10)$$

Furthermore, in the block B10, the microprocessor determines the mean shear stress $\overline{\tau}_s$ in the shear band $h_s$ as follows:

[Math. 11]

$$\overline{\tau}_s = \dfrac{1}{h_s} \int_{y=0}^{y=h_s} \tau_s \, dy_s \quad (11)$$

It will be noted that the trend of the temperature in the primary shear band can be described by the following two-dimensional heat equation:

[Math. 12]

$$K\Delta T - \rho c_{cp} \left[ V_x \dfrac{\partial T_s}{\partial x_s} + V_n \dfrac{\partial T_s}{\partial y_s} + Q \right] = 0 \quad (12)$$

Given the small dimensions of the shear band, the thermal conductivity is negligible and the thermal phenomena in the shear band evolve in adiabatic conditions, thus making it possible to cancel the term $K\Delta T$ (i.e., $K\Delta T \approx 0$). Furthermore, the Taylor-Quinney coefficient $\chi$ (for example taken equal to 0.9) represents the portion of the plastic work converted into heat according to the following equation:

[Math. 13]

$$\rho c_p V_n = \chi \tau_s \dfrac{d\gamma}{dt} \quad (13)$$

Moreover, knowing the shear stress $\tau_s$ and the shear deformation $\gamma_s$ in the primary shear band, as well as the thermal conductivity and diffusivity of the material machined, it is possible to estimate the thermal partitions between the chip and the surface. In fact, in the block B11, the microprocessor is also configured to calculate the temperature in the shear band $T_s$ according to the following formula:

[Math. 14]

$$T_s = T_0 + R_1 \left( \dfrac{\chi \tau_s \gamma_s}{\rho c_{cp}} \right) \quad (14)$$

The variable $R_1$ is the partition coefficient defined as a function of the thermal diffusivity $k_1$ of the material, of the cutting speed $v_c$, of the rake angle $\gamma_n$, and of the non-deformed chip thickness h, according to the following formula:

[Math. 15]

$$R_1 = \dfrac{1}{\left(1 + 1.328 \sqrt{\dfrac{k_1 \gamma}{v_c h}}\right)} \quad (15)$$

It will be noted that a thick chip (h>0.1 mm) allows the calories generated during the formation of the chip to be effectively discharged and makes it possible to lower the temperature on the machined surface. Furthermore, the increase in cutting speed makes it possible to generate an adiabatic cut and lower the temperature on the machined surface.

In the block B12, the microprocessor is configured to calculate the specific cutting coefficients comprising a cutting edge tangential force coefficient $K_{tc}$, a cutting edge radial force coefficient $K_{rc}$, and a cutting edge axial force coefficient $K_{ac}$, as a function of the shear stress $\tau_s$, the oblique shear angle $\phi_i$, the normal shear angle $\phi_n$, the normal projection angle $\theta_n$, the oblique projection angle $\theta_i$, and the helix angle $\lambda_s$. The specific cutting coefficients are defined by the following equations:

[Math. 16]

$$K_{tc} = \dfrac{\overline{\tau}_s(\cos\theta_n + \tan\theta_i \tan\lambda_s)}{[\cos(\theta_n + \phi_n)\cos\phi_i + \tan\theta_i \sin\phi_i]} \sin\phi_n \quad (16)$$

[Math. 17]

$$K_{rc} = \dfrac{\overline{\tau}_s \sin\theta_n}{[\cos(\theta_n + \phi_n)\cos\phi_i + \tan\theta_i \sin\phi_i]} \cos\lambda_s \sin\phi_n \quad (17)$$

[Math. 18]

$$K_{ac} = \dfrac{\overline{\tau}_s(\tan\theta_i - \cos\theta_n \tan\lambda_s)}{[\cos(\theta_n + \phi_n)\cos\phi_i + \tan\theta_i \sin\phi_i]} \sin\phi_n \quad (18)$$

The values of these specific coefficients make it possible to predict the thermomechanical loading during the machining of a part.

In fact, the microprocessor is configured to frame cutting parameters so that the values of the specific coefficients lie within an interval guaranteeing the integrity of the machined part.

Advantageously, the cutting parameters are operational cutting parameters that are easy to measure during the machining such as the power P or the torque C at the spindle of the machining machine or the electrical current circulating in the machining machine.

Thus, the microprocessor uses the integrity model to frame the cutting parameters in order for the values of the specific output coefficients to be representative of an optimal material integrity of the machined part.

First of all, in the block B13, the microprocessor is configured to calculate instantaneous machining forces comprising a cutting edge tangential force $F_t$, a cutting edge radial force $F_r$, and a cutting edge axial force $F_a$, as a function of the specific cutting coefficients (cutting edge tangential force coefficient $K_{te}$, a cutting edge radial force coefficient $K_{re}$, a cutting edge axial force coefficient $K_{ae}$)

and an engaged tooth width $b_{\lambda s}$ (i.e. the length of contact between the tooth and the surface) and the instantaneous non-deformed chip thickness h. These instantaneous machining forces are defined by the following expressions:

[Math. 19]
$$F_t = K_{tc} \times b_{\lambda s} \times h + K_{te} \times b_{\lambda s} \quad (19)$$

[Math. 20]
$$F_r = K_{rc} \times b_{\lambda s} \times h + K_{re} \times b_{\lambda s} \quad (20)$$

[Math. 21]
$$F_a = K_{ac} \times b_{\lambda s} \times h + K_{ae} \times b_{\lambda s} \quad (21)$$

It will be noted that the cutting edge force coefficients $K_{te}$, $K_{re}$, and $K_{ae}$ are practically equal to 0 because the cutting edge acuity radius $r_\beta$ tends towards 0 for a new cutting tool or one in good condition.

Next, the microprocessor is configured to determine at least one operational cutting parameter. A first operational parameter corresponds to a torque C at the spindle defined as a function of the cutting speed $v_c$ and of the diameter of the tool D, according to the following relationship:

[Math. 22]
$$C = \frac{D}{2} F_t \quad (22)$$

A second operational parameter corresponds to a power P at the spindle defined as a function of the cutting edge tangential force $F_t$ and of the cutting speed $v_c$ according to the following relationship:

[Math. 23]
$$P = V_c \times F_t \quad (23)$$

Other types of operational parameters can be determined such as, for example, the electrical current intensity circulating in the machining machine or the vibration at the spindle.

Next, the microprocessor is configured to establish fatigue abatement thresholds as a function of the corresponding operational parameters accounting for a machining anomaly or a tool break.

Thus, in operational mode, the acquisition module 3 is configured to acquire, at successive instance of the machining, values of an operational signal (power, torque, electrical current, etc.) from the machining machine.

Furthermore, the microprocessor 5 is configured to compare the value of the operational signal to the corresponding fatigue threshold in order to check that the operational signal does not exceed the fatigue threshold, thus guaranteeing the material integrity of the machined part.

Hereinbelow, a numerical example that describes the learning steps of the block diagram of FIG. 2 is described. It will be noted that the algorithm of this example is valid for the formation of a chip for all metal materials and according to all machining methods.

The step E1 relates to the acquisition by the microprocessor via the acquisition module 3 or the input interface 9 of the input data corresponding to macroscopic kinematic parameters (see block B2). As an example, the input data are as follows:
R=12.5; #tool radius [mm]#
v=60*1/60; #cutting speed [m/s]#0
fz=0.37; #tooth advance [mm/rev/Z]#
ae=0.5; #radial engagement [mm]#
ap=6; #axial engagement [mm]#
$\gamma_n$=10*(Pi/180); #rake angle $\gamma_n$ [rad]#
$\lambda_s$=45*(Pi/180); #helix angle [rad]#
$\beta_\alpha$=(19.1+0.29 $\gamma_n$*180/Pi/180; #angle of friction on the cutting face [rad]#

In the step E2, the microprocessor calculates the values of the cutting parameters according to the following formulae:
$\theta_{st}$=Arccos (1−ae/R); #input immersion angle [rad]#
$\theta_c$=Arctan[$\sqrt{a_e(2(R-a_e))}$/(R−$a_e$)]; #critical immersion angle [rad]#
$\theta_p$=Arcsin ($r_\beta$/$f_z$)+$\theta_{ex}$; #ploughing immersion angle [rad]#
$\theta_{ex}$=Arcsin (−$f_z$/D); #output immersion angle [rad]#

$$h_{max} = R - \sqrt{f_z^2 + R^2 - 2f_z\sqrt{a_e(2(R-a_e))}} \; ;$$

maximum non-deformed chip thickness [mm]#
$b_{\lambda s(cut)}$=R($\theta_{st}$−$\theta_p$)/sin $\lambda_s$; #length of tooth material contact in cutting event [mm]#
$b_{\lambda s(plou)}$=R($\theta_p$−$\theta_{ex}$)/sin $\lambda_s$; #length of tooth material contact in ploughing event [mm]#
h[θ]:=$f_z$ sin[θ−$\theta_{ex}$], $\theta_c$≤θ≤$\theta_{ex}$; #cut thickness as a function of immersion angle [mm]#

The results of the cutting parameters are:
$\theta_{st}$=16.26°
$\theta_c$=14.59°
$\theta_{pl}$=0.66°
$\theta_{ex}$=−0.86°
$h_{max}$=0.1 mm
$b_{\lambda s(cut)}$=4.81 mm
$b_{\lambda s(plou)}$=0.47 mm Next, in the step E3, the microprocessor implements a numerical iteration defined below (see also block B5) to determine the oblique cutting parameters:

*FindRoot*

[

$\sin\theta_i == \sin\beta_a \sin\eta$, $\tan(\theta_n + \gamma_n) == \tan\beta_a \cos\eta$, $\sin\phi i == \sqrt{2\sin\theta_i}$ $\cos(\phi_n + \theta_n) == \tan\theta_i \tan\phi_i$ $\tan\eta = [1/\sin\phi_n][\tan\lambda_s\cos(\phi_n - \gamma_n) - \cos\gamma_n\tan\phi_i]$, $\{\theta_i, 0.1\}, \{\theta_n, 0.1\}, \{\phi_i, 0.1\}, \{\phi_n, 0.1\}, \{\eta, \lambda_s\}$

]

By applying the above iterative steps, the microprocessor gives the following results of the oblique cutting parameters:
η=43.30°
$\theta_i$=14.89°
$\theta_n$=3.38°
$\phi_i$=21.37°
$\phi_n$=40.6°

It will be noted that the angles do not depend on the non-deformed chip thickness h.

In the step E4, the microprocessor calculates the value of the thickness of the shear band hs by using the formula below:

$$h_s = h/10 \sin \phi_n$$

The result of the shear band thickness $h_s$ is:
$h_s=0.015$ mm
In the step E5, the microprocessor calculates the value of the asymmetry factor k by using the formula below:

$$k=(\sin \phi \, \sin(\phi-\gamma_n)/\cos \gamma_{n0}$$

The result of the value of the asymmetry factor k is:
k=33.7%.
In the step E6, the microprocessor determines the field of deformation by using the expressions below:
q=3 to 7
$d\gamma_m=(q+1)\times V_c\times\cos(\gamma_n)/h_s\times\cos(\phi_n-\gamma_n)$; #maximum deformation speed [s-1]#
$\gamma_1[y_s]:=d\gamma_m\times(y_s+(1-k)*h_s)(q+1)/(q+1)*V_c*\sin \phi_n*((1-k)*h_s)q$; #deformation in input zone of ZSP#
$\gamma_2[y_s]:=(\cos \gamma_n/(\cos(\phi_n-\gamma_n)\times\sin \phi_n)-(d\gamma_m\times(-y_s+k*h_s)(q+1)/(q+1)*V_c*\sin \phi_n*k*h_s)q)$; #deformation in output zone of ZSP#
The result of the field of deformation is:
$\gamma[0]=1.16$ mm/mm
$\gamma[k*h_s]=1.76$ mm/mm
In the step E7, the microprocessor determines the deformation speed field by using the expressions below:
$d\gamma_1[y_s]:=d\gamma_m\times(y_s+(1-k)*h_s)^q/((1-k)*h_s)^q$
$d\gamma_2[y_s]:=d\gamma_m\times(-y_s+k*h_s)^q/(k*h_s^q$
The result of the deformation speed field is:
$d\gamma_m=298\,145$ s$^{-1}$
$\langle d\gamma\rangle=74\,536$ s$^{-1}$
In the step E8 (see also block B7), the microprocessor determines the temperature field by using the equations (9) and (10), the values given in the table (1) and the following values:

$$t_r=20+273.15;$$

$$t_m=1660+273.15;$$

$$d=1-(T/tm)\hat{}d;$$

$$p=(T/t_m)\hat{}b;$$

$$d\backslash[\text{Gamma}]0=0.01;$$

The result of the temperature field is:
$T_{max}=461.5°$ C.
$T(_{AB})=360.9°$ C.
In the step E9 (see also block B8), the microprocessor determines the shear stress field by using the solution of the temperature field by using the expressions below:

$$\langle\tau_s\rangle=\frac{1}{h_s}\left(\int_{(k-1)h_s}^{0}\tau_1[y_s]dy_s+\int_{0}^{k\times h_s}\tau_2[y_s]dy_s\right)$$

The result of the shear stress field is:
$\tau$[entrance band]=570 MPa
$\tau$[(AB)]=490 MPa
$\tau$[(exit band)]=410 MPa
$\langle\tau_s\rangle=504.7$ MPa
In the step E10 (see also blocks B11 and B12), the microprocessor determines the mechanical stresses by using the equations (16)-(21):
The result of the mechanical stresses is:
$K_{tc}=1334$ MPa
$K_{rc}=166.5$ MPa
$K_{ac}=770$ MPa $F_t=321$ N
$F_r=40$ N
$F_a=185.5$ N
In the step E11 (see also block B12), the microprocessor determines the power at the spindle of the machining machine by using the equation (23). The result of the power is:

$$P=321\text{ W}$$

In the step E12 (see also block B10), the microprocessor estimates the thermal load by using the equations (14) and (15) and the following data:
$T_0=20$; #initial temperature of the surface [° C.]#
$k_1=6.67$; #thermal diffusivity of Ti-6Al-4V [m$^2$/s]#
$T_s$; #temperature in the primary shear band [° C.]#
$R_1$; #thermal partition from the PSZ to the chip [%]#
$T_w=T_0+(1-R_1)\times T_s$
The result of the thermal load is:
$R_1=69.4\%$
$T_w=141°$ C.
The present invention thus offers the following advantages:
Ensuring the manufacturer, for a desired surface integrity, with given tool geometry and material, has a field of use of cutting conditions.
Low computation times: by comparison with the prior art methods in which the computation times can be as long as several weeks. It is therefore possible to perform sensitivity analyses rapidly and stress the parameters of influence for control of the method.
Low costs: compared to the empirical results, which require campaigns of instrumented tests in terms of forces (dynamometer) and temperatures (thermocouples, thermal camera, etc.), the proposed model can be fed with inexpensive tribological tests.
Can be transposed to all materials: this system describes a model that takes account of the behavior law of the material machined. The model can therefore be transposed to any type of metallic material.
Can be transposed to other types of machining methods: all basic cutting, turning, milling, drilling and planning (broaching) machining methods generate the same thermomechanical chip formation phenomena, but in different configurations (continuous cutting for turning and drilling, discontinuous cutting for milling and planning), (contained medium for drilling) It is therefore possible to estimate the loading case for each machining method.
While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A control system used in the machining of a part by a machining machine, comprising:
   an acquisition module configured to acquire values of a set of input parameters relating to cutting conditions and properties of a material of said part, and
   a microprocessor configured to:
      determine at least one operational cutting parameter representative of a cutting signal from the machining machine by using a set of output parameters of an integrity model constructed previously in a learning phase, said integrity model linking said set of input parameters to said set of output parameters comprising specific cutting coefficients representative of a material integrity of the part, and
      establish at least one fatigue threshold of said at least one operational cutting parameter, said fatigue threshold allowing a progress of cutting operations to be controlled,
   wherein
   the acquisition module is configured to acquire, in the learning phase, values of input parameters comprising:
      macroscopic kinematic parameters comprising a cutting speed parameter, a tooth advance parameter, a parameter of axial engagement of a tool, and a parameter of radial engagement of the tool;
      parameters of a geometry of the tool comprising a rake angle and a helix angle;
      tribology parameters comprising a mean angle of friction; and
      parameters of the material comprising a specific heat capacity, a density and a Taylor-Quinney coefficient; and
   the microprocessor is configured to construct the integrity model by using physical analytical and/or empirical relationships linking said set of input parameters to said set of output parameters representative of the cutting forces.

2. The control system according to claim 1, wherein:
   said acquisition module is configured to acquire, during the machining of the part, at least one cutting signal, and
   said microprocessor being configured to control the progress of the cutting operations by ensuring that a value of said at least one cutting signal is bounded by said fatigue threshold.

3. The control system according to claim 1,
   wherein said at least one operational cutting parameter is a torque parameter representative of a torque signal from the machining machine or a power parameter representative of a power signal from the machining machine, and
   wherein said at least one fatigue threshold is a torque threshold or a power threshold.

4. The control system according to claim 3, wherein the microprocessor is configured to
   calculate, by using geometrical and empirical relationships, the values of angles characteristic of an oblique cutting comprising an oblique shear angle, a normal shear angle, a normal projection angle, an oblique projection angle and a chip flow angle, as a function of values of a mean angle of friction, of a rake angle and of a helix angle, and
   calculate, by using analytical and empirical relationships, values of the parameters of the orthogonal cutting comprising the thickness values of a shear band, and an asymmetry factor by using the values of a cutting speed, the normal shear angle and the rake angle.

5. The control system according to claim 4, wherein the microprocessor is configured to
   determine a shear deformation and deformation ratio values in the primary shear band as a function of the thickness values of the shear band and of the asymmetry factor, and
   use a law of behavior of the material and said shear deformation and deformation ratio values as well as the parameter values of the material to determine a shear stress in the primary shear band.

6. The control system according to claim 5, wherein the microprocessor is configured to calculate the specific cutting coefficients comprising a cutting edge tangential force coefficient, a cutting edge radial force coefficient and a cutting edge axial force coefficient, as a function of the shear stress, and the oblique shear angle, the normal shear angle, the normal projection angle, the oblique projection angle and the helix angle.

7. The control system according to claim 6, wherein the microprocessor is configured to
   calculate instantaneous machining forces comprising a cutting edge tangential force, a cutting edge radial force, and a cutting edge axial force, as a function of the specific cutting coefficients, including, a cutting edge tangential force coefficient, a cutting edge radial force coefficient, a cutting edge axial force coefficient, an engaged tooth width, and a chip thickness,
   calculate the torque parameter at a spindle and the power parameter at the spindle as a function of the cutting edge tangential force, the cutting speed and the diameter of the tool, and
   establish a torque threshold and a power threshold as a function of the torque and power parameters.

8. A numerically-controlled machining machine comprising the control system according to claim 1.

9. A control method used in the machining of a part by a machining machine, comprising the following steps:
   acquiring values of a set of input parameters relating to cutting conditions and material properties of said part, and
   determining at least one operational cutting parameter representative of a cutting signal from the machining machine by using a set of output parameters of an integrity model constructed previously in a learning phase, said integrity model linking said set of input parameters to said set of output parameters comprising specific cutting coefficients representative of the material integrity of the part,
   establishing at least one fatigue threshold of said at least one operational cutting parameter, said fatigue threshold allowing a progress of cutting operations to be controlled,
   acquiring, in the learning phase, values of input parameters comprising:
      macroscopic kinematic parameters comprising a cutting speed parameter, a tooth advance parameter, a parameter of axial engagement of a tool, and a parameter of radial engagement of the tool;
      parameters of a geometry of the tool comprising a rake angle and a helix angle;
      tribology parameters comprising a mean angle of friction; and
      parameters of the material comprising a specific heat capacity, a density and a Taylor-Quinney coefficient; and constructing the integrity model by using physical analytical and/or empirical relationships linking said set of input parameters to said set of output parameters representative of the cutting forces.

* * * * *